United States Patent [19]

Kawamura et al.

[11] 4,295,654
[45] Oct. 20, 1981

[54] SEAL ASSEMBLY FOR A LINKAGE

[75] Inventors: Toshio Kawamura, Isehara; Noboru Harashima; Hideo Ueda, both of Hiratsuka; Seijiro Sano, Ninomiya, all of Japan

[73] Assignee: Kabushiki Kaisha Komatsu Seisakusho, Tokyo, Japan

[21] Appl. No.: 148,585

[22] Filed: May 12, 1980

[30] Foreign Application Priority Data

May 11, 1979 [JP] Japan .............................. 54-61766[U]
Oct. 5, 1979 [JP] Japan ............................ 54-137432[U]
Oct. 5, 1979 [JP] Japan ............................ 54-137433[U]

[51] Int. Cl.³ .......................... F16J 15/34; F16J 15/32
[52] U.S. Cl. ....................................... 277/92; 277/95; 277/96.2; 277/152; 305/11
[58] Field of Search ................... 277/92, 95, 96.2, 152; 305/11-13

[56] References Cited

U.S. PATENT DOCUMENTS

| 3,244,457 | 4/1966 | Ross ..................................... 305/11 |
| 3,390,922 | 7/1968 | Reinsma ............................... 305/11 |
| 3,810,637 | 5/1974 | Bonvin ............................... 277/96.2 |
| 3,841,718 | 10/1974 | Reinsma ............................... 305/11 |
| 4,089,531 | 5/1978 | Roley et al. ............................ 277/92 |
| 4,132,418 | 1/1979 | Roli ................................... 305/11 X |
| 4,195,852 | 4/1980 | Roley et al. ........................... 277/92 |

FOREIGN PATENT DOCUMENTS

| 53435 | 6/1945 | France ................................. 277/92 |
| 1050298 | 12/1966 | United Kingdom ................. 277/92 |

Primary Examiner—Robert S. Ward, Jr.
Attorney, Agent, or Firm—Armstrong, Nikaido, Marmelstein & Kubovcik

[57] ABSTRACT

A seal assembly for a joint of each pair of adjacent links of an endless track assembly comprising a wear-resistant elastomeric seal ring and a resilient elastomeric load ring. A wear-resistant annular plate is bonded to one of the members of the joint. The load ring is compressed when mounted in place, thus urging the seal ring in sealing contact with the wear-resistant annular plate.

6 Claims, 6 Drawing Figures

SEAL ASSEMBLY FOR A LINKAGE

BACKGROUND OF THE INVENTION

This invention relates to a seal assembly and more particularly to a seal assembly for a linkage, such as a track linkage, which is subject to oscillatory motions.

U.S. Pat. No. 3,841,718 discloses a seal assembly for a track linkage in which an outer link and an inner link have overlapping ends joined in a pin joint connection providing for a relative rotation about a pin which extends through the ends of both links, the pin being connected to the outer link and rotating within a bushing connected to the inner link, the bushing having an end face facing a counterbore in the inner face of the outer link. The seal assembly comprises a crescent-shaped seal ring and a load ring partially encompassed by the seal ring. The crescent-shaped seal ring has a driving flange, a sealing flange and a thin flexible hinge section connecting the two flanges. The load ring fits within the seal ring to press the driving flange into an interference fit with the counterbore walls to cause the driving torque to be transmitted through the seal ring, while the load ring transmits most of the force with which the sealing flange is urged into sealing engagement with the end face of the bushing.

The seal ring is made of a tough wear-resistant or abrasion-resistant material and the load ring is made of an elastomeric material having good spring characteristics over a wide operating temperature range.

While the above described seal assembly has proved effective in practical applications, it has been found that the seal assembly poses some problems. Since the sealing flange is urged in sealing contact with the end face of the bushing, the end face tends to wear to produce a shallow annular groove thereon when it is used for a long period. As a result, when the bushing is reinstalled by turning the other way around after a considerable of service time as in a common practice in the art concerned, even if a new seal assembly is installed in the counterbore it is difficult to obtain a good sealing effect due to the presence of the shallow annular groove on the end face of the bushing, thus resulting in leakage of lubricant and intrusion of dirt therethrough. Although it is necessary to finish the end face of the bushing under 1 μm in order to improve the durability of the seak assenbly, lapping of the end face is not easy to perform and results in an inefficient working.

Besides, when the hardness of the end face of the bushing is raised by heat treatment in order to improve wear-resistant characteristics thereof, toughness of the bushing itself will deteriorate.

Therefore there has been a practical limit to the improvement of the wear-resistant characteristics of the end face of the bushing.

SUMMARY OF THE INVENTION

It is therefore an object of the present invention to provide an improved seal assembly for a linkage which can overcome the above noted problems.

Another object of the present invention is to provide a seal assembly for a track linkage wherein a wear-resistant annular plate is bonded or otherwise secured to the end face of a bushing thereby preventing the wear of the end face.

In accordance with an aspect of the present invention, there is provided a seal assembly in an annular cavity formed by first and second members which are subject to relative rotation, the first member forming an axially facing end wall and a radially facing side wall of the cavity, the second member having an end face forming another axially facing end wall of the cavity opposite the one axially facing end wall, said seal assembly comprising: a load ring of resilient elastomeric material disposed in said cavity adjacent the end wall of said first member; a seal ring of wear-resistant elastomeric material bonded to said load ring, said seal ring having a lip formed thereon; and a wear-resistant annular plate bonded to the end face of said second member whereby said load ring is axially compressed between said first and second members thereby urging said lip into sealing contact with said wear-resistant annular plate.

Since the end face of the second member has mounted thereon a wear-resistant annular plate, the end face itself will not wear down. In a track linkage, the first member is an outer link connected for relative rotation with an inner link by a pin and the second member is a bushing disposed between the pin and the inner link. Therefore, when reinstalling the bushing by turning it other way around after a considerable of service time, a new wear-resistant annular plate can be substituted for the old one which has been subjected to the sealing contact with the seal ring and hence worn out.

Therefore service life of the bushing can be prolonged and the reinstalled bushing with a new wear-resistant annular plate bonded thereon can provide a good sealing effect with a cooperative seal ring which may be also substituted for the old one. Besides, since the wear-resistant annular plate can be produced separately from the production of bushing, it is possible to use high hardness and high wear-resistant materials for the production of wear-resistant annular plates and to enable a high grade fine lapping of the sealing surface of a wear-resistant annular plate to be made.

The above and other objects, features and advantages of the present invention will be readily apparent from the following description taken in conjunction with the accompanying drawings.

DESCRIPTION OF THE PREFERRED EMBODIMENTS

The present invention will now be described in detail with reference to the accompanying drawings.

The seal of the present invention has particular utility in track joints, and is described below with reference thereto.

Figure 1:
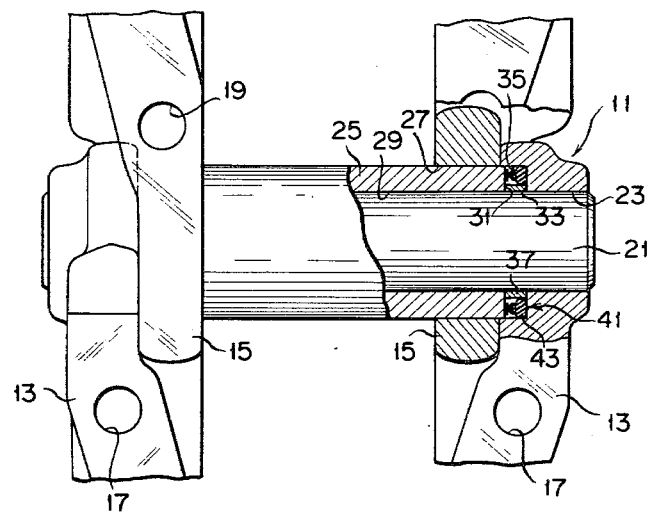
FIG. 1 is a fragmentary plan view, partially broken away to show details of construction, of a track linkage incorporating a seal constructed in accordance with one embodiment of the present invention.

In FIG. 1, a portion of an endless track (less the track shoes) in a track mechanism for a track type tractor is indicated generally by the reference numeral 11.

The track mechanism 11 includes outer links 13 and inner links 15. Track shoes (not shown in the drawings) are connected to the links 13 and 15 by bolts which extend through bolt holes 17 and 19.

The overlapping ends of the links 13 and 15 are connected in a pin joint connection for relative rotation by a pin 21. The bushing 25 is connected to the inner links 15 usually by a press fit connection between the bushing and a bore 27 in each end of the inner link 15.

Thus, during relative rotation of the links 13 and 15, as happens when the track passes over the sprocket, the pin 21 rotates within the inner bore 29 of the bushing. During relative rotation of the links 13 and 15, the axially directed end face 31 of the bushing rotates with respect to an end wall 33 of a counterbore or annular cavity 35 formed in the link 13. The seal of the present invention, indicated generally by the reference numeral 41, is disposed within the counterbore 35 to prevent leakage of lubricants from within the inner bore 29 of the bushing and to prevent the entry of foreign matter into the inner bore 29 of the bushing.

As illustrated in FIG. 1 a thrust ring 37 may be used to provide spacing between the overlapping ends of the links 13 and 15. Alternatively, the link 13 may be machined to incorporate the thrust ring integrally with the link.

In accordance with the present invention, the seal assembly 41 generally incorporates a seal ring 43 and a load ring 45. The load ring 45 is disposed in the counterbore 35 in contact with the end wall 33 of the outer link 13 and is made of an elastomer having excellent spring characteristics, such as natural rubber, nitrile rubber, acrylic rubber or silicon rubber.

A reinforcing annular steel plate 47 is bonded to the load ring 45 and the seal ring 43 is bonded to the reinforcing plate 47 in turn. The preferable bonding agent includes epoxy resin, nitrile-denatured phenol resin and denatured acrylic resin, etc.

The seal ring 43 has a seal lip 49 formed thereon and has a generally pentagonal shape in cross-section. The seal ring 43 is preferably made of wear-resistant or abrasion-resistant elastomeric materials such as ultra-high-molecular-weight polyethylene, oleo-6,6 nylon, oleopolyacetal, polyurethane rubber blended with polytetrafluoroethylene, or high hardness urethane rubber.

Bonded to the axially directed end face 31 of the bushing 25 is a wear-resistant annular plate 51 preferably made of heat treated SK5 steel, carburized SCM21 steel (Japanese Industrial Standard), steel plated hard chromium or ceramic.

The sealing surface of the wear-resistant annular plate 51 must be lapped to give a surface roughness of under 1 μm in order to attain a good sealing effect.

Since the load ring 45 is made of elastomeric material having a good spring characteristics, the load ring 45 is compressed axially when the seal assembly 41 is disposed in the counterbore 35 to urge the lip 49 of the seal ring 43 into sealing contact with the wear-resistant annular plate 51 thereby preventing leakage of lubricants from within the inner bore 29 of the bushing 25 and preventing the entry of foreign matter into the inner bore 29 of the bushing 25.

The primary function of the reinforcing annular plate 47 is to help maintain the lip 49 of the seal ring 43 in intimate sealing contact with the wear-resistant annular plate 51. The reinforcing annular plate 47 can, therefore, be omitted if good sealing contact of the lip 49 with the wear-resistant annular plate 51 is realized without providing it.

Since the wear-resistant annular plate 51 is bonded to the end face 31 of the bushing 25, if and when the annular plate 51 is worn out after being subjected to the sealing contact with the lip 49 of the seal ring 43 for a long time, a new wear-resistant annular plate can be substituted for the old one and bonded to the end face 31 of the bushing 25. Therefore service life of the bushing can be considerably prolonged. When substituting a new wear-resistant annular plate for the old one, it is a common practice to turn the bushing the other way around.

Figure 2:
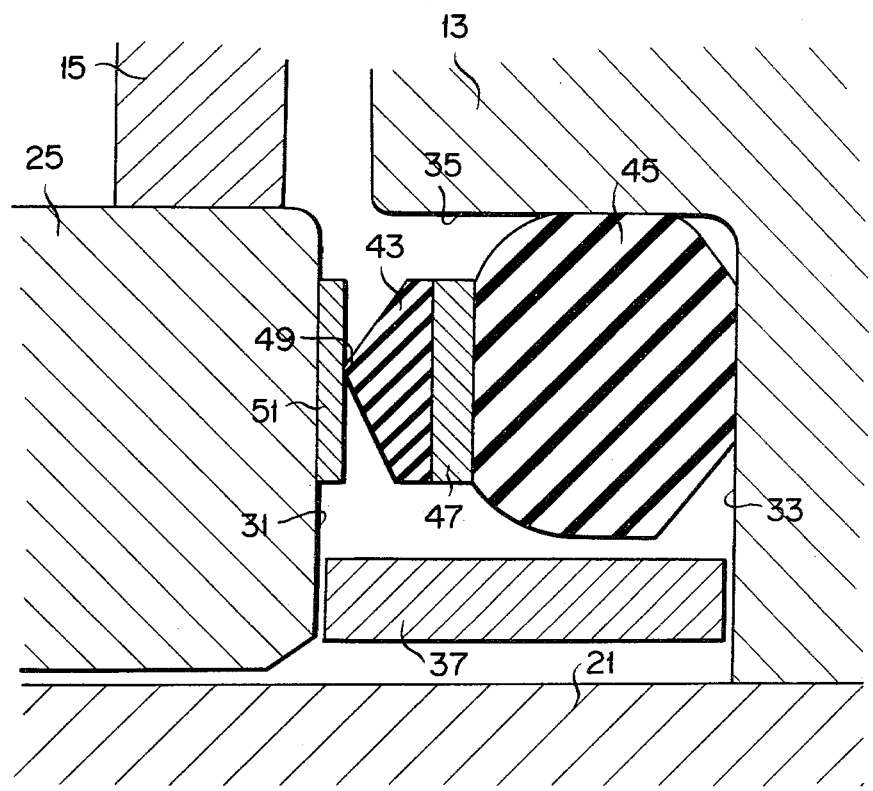
FIG. 2 is an enlarged cross-sectional view of a seal assembly according to the present invention.
Figure 3:
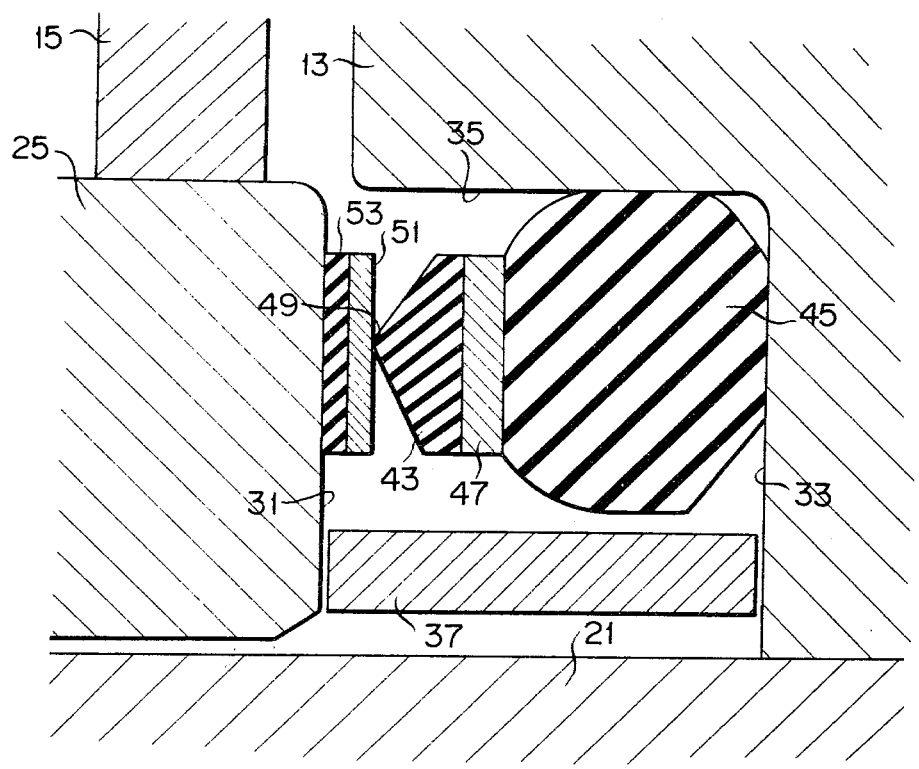
FIG. 3 is a modification of the seal assembly shown in FIG. 2.

Referring now to FIG. 3 which shows a modification of the embodiment of FIG. 2, the wear-resistant annular plate 51 is mounted to the bushing 25 through an elastomer annular plate 53. That is, the elastomer annular plate 53 is bonded to the end face 31 of the bushing 25 and the wear-resistant annular plate 51 is bonded to the elastomer annular plate 53.

Figure 4:
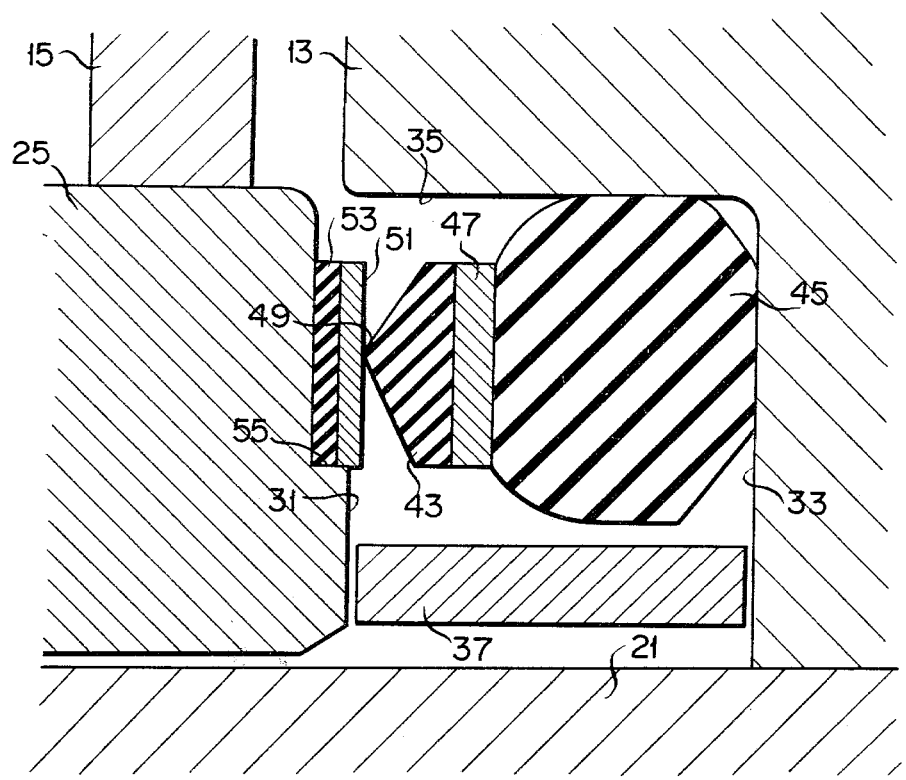
FIG. 4 is another modification of the seal assembly shown in FIG. 2.

FIG. 4 shows still another modification of the embodiment of FIG. 2 in which the end face 31 of the bushing 25 has formed thereon an annular step 55 on which the elastomer annular plate 53 carrying the wear-resistant annular plate 51 is press fitted. Both the annular plates 51 and 53 are bonded together but the elastomer annular plate 53 is not bonded to the end face 31 of the bushing 25 but is merely tightly mounted on the annular step 55 of the end face 31.

Figure 5:
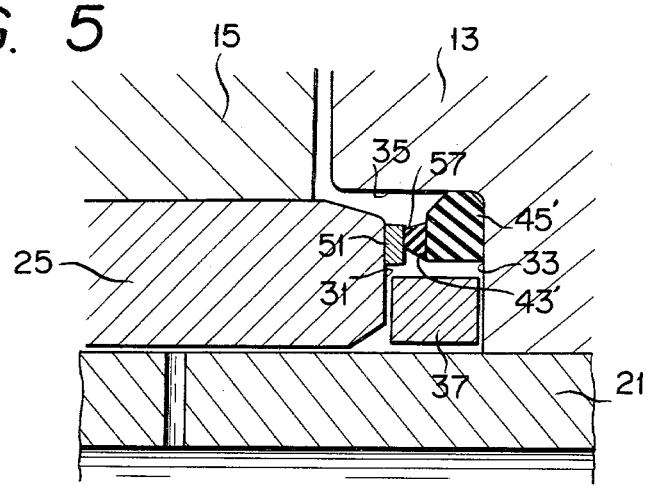
FIG. 5 is another embodiment of a seal assembly according to the present invention.

Referring now to FIG. 5 showing another embodiment of the present invention in which a seal ring 43' having trapezoidal cross-section is bonded to a load ring 45'. The seal ring 43' has formed thereon a seal surface 57 which is urged by the axial compression force of the load ring 45' into sealing contact with a wear-resistant annular plate 51 bonded to the end face 31 of the bushing 25. The wear-resistant annular plate 51 of this embodiment is made of the same material as that of the first embodiment shown in FIG. 2.

Figure 6:
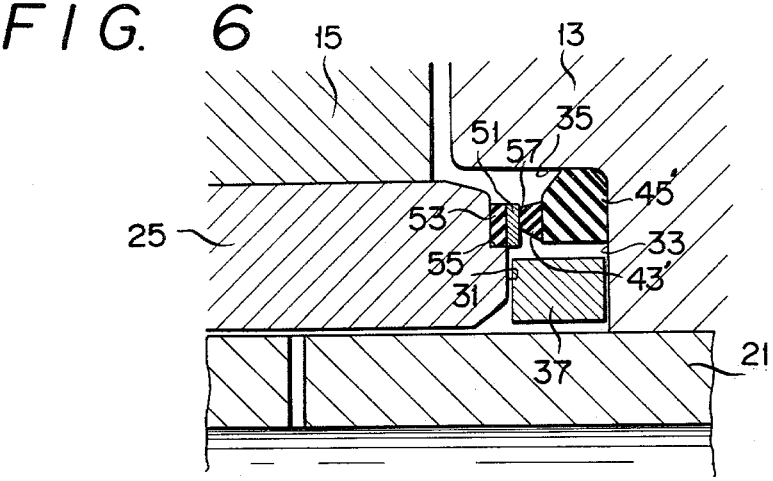
FIG. 6 is a modification of the seal assembly shown in FIG. 5.

FIG. 6 shows a modification of the second embodiment shown in FIG. 5, in which the end face 31 of the bushing 25 has formed thereon an annular step 55 on which an elastomer annular plate 53 is press fitted. The wear-resistant annular plate 51 is bonded to the elastomer annular plate 53 but the elastomer annular plate 53 is not bonded to the end face 31 of the bushing 25 but is merely tightly mounted on the annular step 55 formed on the end face 31.

It is to be understood that the foregoing description is merely illustrative of preferred embodiments of the present invention, and that the scope of the invention is not to be limited thereto, but is to be determined by the appended claims.

What we claim is:

1. A seal assembly in an annular cavity formed by first and second members which are subject to relative rotation, the first member forming an axially facing end wall and a radially facing side wall of the cavity, the second member having an end face forming another axially facing end wall of the cavity opposite the one axially facing end wall, said seal assembly comprising:

a load ring of resilient elastomeric material disposed in said cavity adjacent the end wall of said first member;

a seal ring of wear-resistant elastomeric material bonded to said load ring, said seal ring having a lip formed thereon; and a wear-resistant annular plate bonded to the end face of said second member whereby said load ring is axially compressed between said first and second members thereby urging said lip into sealing contact with said wear-resistant annular plate.

2. A seal assembly as recited in claim 1 further comprising an annular reinforcing plate bonded between said load ring and said seal ring for maintaining said lip in intimate sealing contact with said wear-resistant annular plate.

3. A seal assembly as recited in claim 1 or 2 further comprising an elastomeric annular plate bonded directly to the end face of said second member and wherein said wear-resistant annular plate is bonded to said elastomeric annular plate.

4. A seal asssembly as recited in claim 1 or 2 wherein the end face of said second member has an annular step formed thereon and wherein said wear-resistant annular plate is mounted on the annular step and bonded to the end face of said second member.

5. A seal assembly in an annular cavity formed by first and second members which are subject to relative rotation, the first member forming an axially facing end wall and a radially facing side wall of the cavity, the second member having an end face forming another axially facing end wall of the cavity opposite the one axially facing end wall, said seal assembly comprising:

a load ring of resilient elastomeric material disposed in said cavity adjacent the end wall of said first member;

a seal ring of wear-resistant elastomeric material bonded to said load ring, said seal ring having a trapezoidal shape in cross-section and a seal face formed thereon; and a wear-resistant annular plate bonded to the end face of said second member whereby said load ring is axially compressed between said first and second members thereby urging the seal face of said seal ring into sealing contact with said wear-resistant annular plate.

6. A seal assembly as recited in claim 5 wherein the end face of said second member has an annular step formed thereon and wherein said wear-resistant annular plate is mounted on the annular step and bonded to the end face of said second member.

* * * * *